April 11, 1944.  L. A. EDERER  2,346,477
ANTISKID DEVICE
Filed March 2, 1942
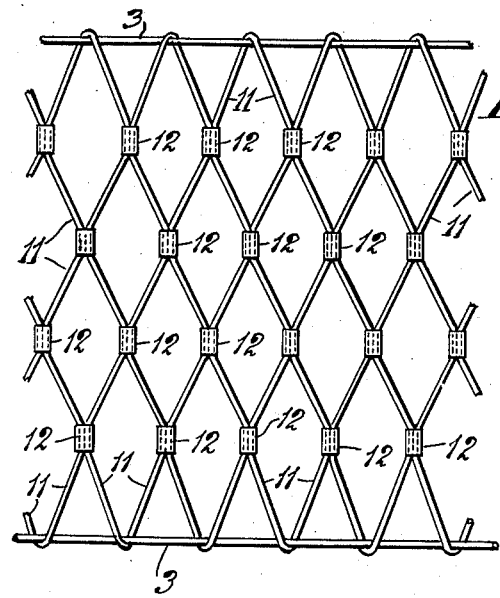
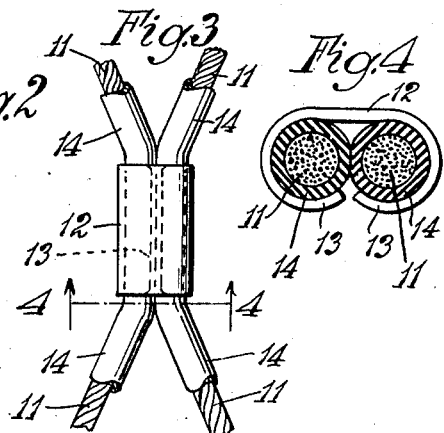
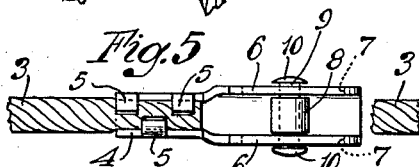
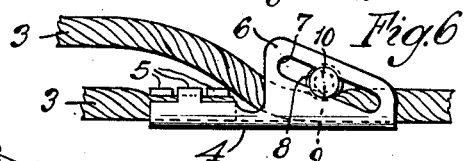
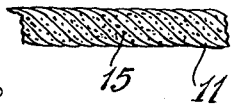
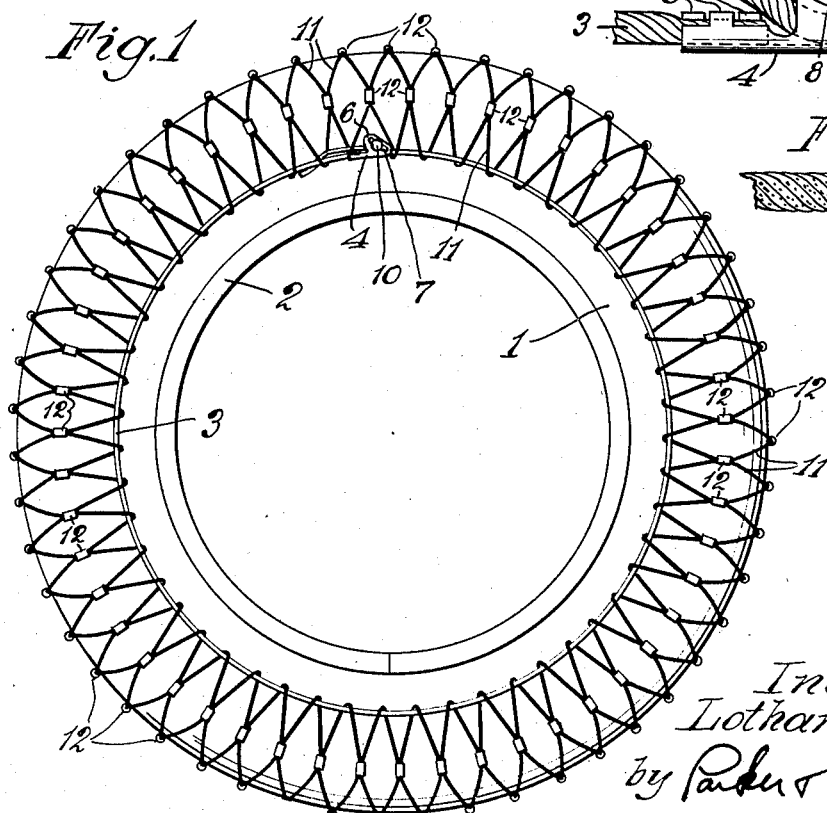
Inventor
Lothar A. Ederer
by Parker & Carter
Attorneys.

Patented Apr. 11, 1944

2,346,477

UNITED STATES PATENT OFFICE 2,346,477

ANTISKID DEVICE

Lothar A. Ederer, Chicago, Ill.

Application March 2, 1942, Serial No. 433,011

7 Claims. (Cl. 152—221)

This invention relates to improvements in antiskid or non-skid devices. In the past such devices have been largely made of metal. The present device is made preferably of rope.

One object of the invention is, therefore, to provide a satisfactory anti-skid device for wheels or tires in which the anti-skid elements are formed of rope which may be of fiber such as manila fiber, or may be of metal rope or cable.

Another object is to provide an anti-skid device formed of cable or rope in which a single length of rope forms the road-contacting element of the device.

Another object is to provide a device of the character indicated in which the rope or cable is treated with rubber or provided with a complete rubber covering, as desired.

Other objects will appear from time to time throughout the specification and claims.

The invention is illustrated more or less diagrammatically in the accompanying drawing, wherein:

Figure 1 is a side elevation of the device of this invention in a position about the tire of a wheel.

Figure 2 is a plan view showing the anti-skid device extended.

Figure 3 is an enlarged detail of one of the joints.

Figure 4 is a transverse sectional detail taken on an enlarged scale at line 4—4 of Figure 3.

Figure 5 is a plan view of one form of attachment for the side member.

Figure 6 is a side elevation of that member.

Figure 7 is a fragmentary view of a modified form of cable or rope.

Like parts are indicated by like characters throughout the specification and the drawing.

As shown in Figure 1, 1 is a tire which may be in position on a rim 2. The tire is of a type suitable for automobiles or trucks, but the invention is not limited to application to such a tire, although it is most widely used in connection with a pneumatic tire.

The anti-skid device comprises two side members or cables 3, 3. As shown, there is preferably one of these cables on each side of the device, and one therefore extends about each side of the tire or wheel when the device is in place. As shown in Figure 5, there is mounted on one end of each member 3 an engaging means 4 which is positioned wholly or partly about that end of the cable to which it is attached and may include members 5, 5, which are inwardly bent over the cable. The member 4 has integrally attached to it a pair of side members 6, 6. As shown in Figure 6 particularly, these side members are provided with parallel inclined slots 7, one such slot being formed in each of the members 6.

Positioned between the side members 6 is a roller 8 which is carried on a shaft 9, the ends of which are riveted over or enlarged as at 10. As shown in Figures 5 and 6, particularly when each cable 3 is positioned about a tire or wheel, one end of the cable is thrust between the side members 6 and below the roller 8. An outward pull on that member of the cable tends to force the roller 8 downwardly along the slots 7, and thus effects a locking, so that the end of the cable is held in place. Obviously many other forms of locking or latching means might be provided for holding the cable 3 sufficiently tightly about the wheel or tire to which the device is applied.

The element which forms the road contacting part is a rope or cable 11. As shown particularly in Figures 1 and 2, this element is passed back and forth between each of the side members 3. At suitable points intermediate the side members, adjacent parts of the member 11 are caught and fastened together by fastening members 12. As shown, these members are preferably formed of metal and have their ends 13, 13 inwardly bent or wrapped about two adjacent parts of the member 11, and thus the member 11 is held together at suitable points intermediate the side parts or cables 3, and thus the clasps 12, 13 have the effect of knots in holding two adjacent parts of the member 11 together so that in effect a net is built up, but this net is neither woven nor tied.

As illustrated in detail in Figures 3 and 4 the body of the member 11 may be formed of a rope or cable, and this may be formed either of hemp or manilla fibers or any other desirable animal or vegetable fibers which can be formed into a rope or cable. Formed about the rope or cable 11 may be a coating 14 of rubber. This is in effect a rubber tube which is positioned or formed about the cable 11, and it may be so formed about the cable even if the latter is made of metal. For some purposes it will be desirable to form the member 11 of a wire rope or cable. When that is done, the rubber covering may be applied substantially as it would be applied about the manila or fiber rope or cable. While rubber has been mentioned above as a protective covering, obviously other forms of covering may be used. The rubber if used may be either natural or synthetic, and other artificial coverings may be used instead of rubber. As shown in Figure 7, the member 11 is formed of rope or cable, and to it a protective covering 15 has been applied. This may be a rubber covering or a covering of some other protective means. The difference between the form of covering shown in Figures 3 and 4 and that shown in Figure 7 is primarily one of thickness. In the case of Figure 7 the cable 11 is in a sense impregnated with the protective material or covering, but the latter is not of great thickness on the outside of the cable. In the forms of Figures 3 and 4, however, the cover is of substantial thickness, and it may be formed wholly on the outside of the cable, or the cable may also be impregnated with a protective covering, even when the latter is present in a substantial thickness. A protective covering may be provided also on the clasps 12, and that may be of the same material as the protective covering 14 or 15 applied to the cable 11, or it may be some other protective covering. Ordinarily the cables 3 may, if desired, receive a protective covering. The importance of the protective covering is probably greatest when applied to the road contacting portions of the device.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawing to be taken as in a broad sense illustrative or diagrammatic, rather than as limiting me to my precise showing.

In particular, a wide variety of end attaching means may be used to fasten the ends of the cable 3 together. Many different forms of clasps may be substituted. Member 12 is merely one suitable form. The side cables may be made of metal or fibers and they may be single ropes or cables. Similarly, the transverse member 11 may be made of metal with or without a protective coating, or it may be made of fibers with or without a protective coating, and whatever material it is made of it may be formed as a single rope or as a cable. The number of clasps used to secure together a given pair of strands of the member 11 may be varied. Thus there are shown in Figures 1 and 2, respectively, rows of clasps 12. There might be more or less.

The use and operation of the invention are as follows:

The device is formed by preparing the side cables 3 and by carrying or passing the transverse cable 11 back and forth between the side cables sufficiently so that it extends substantially from end to end of the side cables in a continuous piece. At suitable intervals adjacent strands of the transverse cable 11 are secured together by the clasps 12. When the desired amount of material has been formed, by passing the transverse cable 11 back and forth between the side cables 3 sufficient times, the ends of the transverse cable 11 are fastened together so that the transverse cable 11 then, in effect, becomes a continuous, endless member.

With the article thus formed, when it is desired to place it about a tire or wheel, one or both of the side cables 3 are unclasped so that their ends are separate from each other. The device is then put into position about a wheel or tire. The ends of the side cables are then fastened together and pulled up to the desired degree of tightness to hold the device against displacement from the wheel or tire. It is not always necessary to disconnect both of the side cables, either to apply or to remove the anti-skid device. In some cases, depending largely upon the size of the wheel or tire and upon the size of the anti-skid device, the latter may be put in place and removed from place with only one of the side cables 3 disconnected.

I claim:

1. In combination in an anti-skid device adapted to be positioned about a wheel, a pair of side members, each adapted to be positioned on one side of a wheel, and an additional continuous transverse member separate from said side members and extending back and forth repeatedly between said side members and attached thereto at a plurality of points, and a plurality of clasping means positioned about and securing together each pair of adjacent strands of said continuous transverse member at a plurality of separated points, said clasping means being rigid and extending outwardly beyond said transverse member to form a rigid, road-engaging member.

2. In combination in an anti-skid device adapted to be positioned about a wheel, a pair of side members, each adapted to be positioned on one side of a wheel, and a separate, continuous, unitary transverse member looped about and extending back and forth repeatedly between said side members, and a plurality of metallic, road-contacting and clasping means positioned about and joining together each pair adjacent strands of said transverse member at a plurality of points, each pair of adjacent strands being joined together at a plurality of points in each of its loops between said side members.

3. In combination in an anti-skid device adapted to be positioned about a wheel, a pair of side members, each adapted to be positioned on one side of a wheel, and a separate, transverse continuous member looped about and extending back and forth repeatedly between said side members, said transverse member being looped about each of said side members, and rigid road-contacting and clasping means positioned about and joining together adjacent strands of said transverse member at a plurality of points, each pair of adjacent strands being joined together at a plurality of separated points in each of its loops between said side members and being spaced apart away from said clasps.

4. In combination in an anti-skid device adapted to be positioned about a wheel, a pair of side members, each adapted to be positioned on one side of a wheel, and a continuous, unitary transverse member extending back and forth repeatedly between said side members, said transverse member being looped back and forth between each of said side members a plurality of times and engaging each of said side members at a plurality of points, and clasping means of rigid metal, road-contacting means positioned about and securing together adjacent strands of said transverse member at a plurality of points, each pair of adjacent strands being repeatedly joined together in each pass between said side members.

5. In combination in an anti-skid device adapted to be mounted upon wheels of different diameters, a pair of flexible side members, said members adapted to be positioned one on each side of a wheel and provided with attaching means, and an anti-skid element comprising one or more cords looped repeatedly back and forth between said side members, each looping being engaged, at one end, directly about one of said side members, and a plurality of metallic joining means clasped about adjacent strands of said anti-skid element, there being a plurality of such clasps on each pair of adjoining strands, said clasps being of greater thickness than the strands which they enclose.

6. In combination in an anti-skid device adapted to be mounted upon wheels of different diameters, a pair of attaching members comprising flexible rope-like parts, one adapted to be mounted on each side of the wheel, each of said rope-like members being provided with self-locking means whereby it may be held tightly in any position of adjustment with respect to a wheel, and an anti-skid member comprising a continuous cord-like member looped repeatedly back and forth between said attaching means and engaging said attaching means directly a plurality of times, and a plurality of rigid anti-skid and clasping means engaging each pair of adjacent strands a plurality of times in each loop between said attaching means, said clasping means being of greater thickness than the strands which they enclose, comprising road-engaging member and being positioned away from said attaching means.

7. In combination in an anti-skid device adapted to be positioned about a wheel, a pair of side members, each adapted to be positioned on one side of the wheel, and adjustable means for joining together the two ends of each side member to cause the same to fit about a wheel, and a continuous net-like structure comprising a continuous member looped repeatedly back and forth by the said side members, and engaging each of said side members at a plurality of separated points, and metallic means for securing adjacent portions of said continuous member together to form a plurality of net-like meshes, said metallic members forming the only adjoining means whereby adjacent parts of said members are secured together.

LOTHAR A. EDERER.